United States Patent

[11] 3,614,393

| [72] | Inventor | Paul E. Sanderson |
| | | Fort Lauderdale, Fla. |
| [21] | Appl. No. | 6,074 |
| [22] | Filed | Jan. 27, 1970 |
| [45] | Patented | Oct. 19, 1971 |
| [73] | Assignee | Sanderson Films, Inc. |

[54] NAVIGATIONAL COMPUTER
8 Claims, 3 Drawing Figs.

| [52] | U.S. Cl. | 235/61 NV |
| [51] | Int. Cl. | G06c 3/00, |
| | | G06g 1/00 |
| [50] | Field of Search | 235/61 NV, |
| | | 78, 88 |

[56] References Cited
UNITED STATES PATENTS

| 2,541,596 | 2/1951 | Martin et al. | 235/88 |
| 2,996,242 | 8/1961 | Bannister | 235/61 NV |
| 3,100,601 | 8/1963 | Shapiro | 235/61 NV |
| 3,231,188 | 1/1966 | Warner | 235/61 NV |

*Primary Examiner*—Stephen J. Tomsky
*Attorney*—Miller & Brown

ABSTRACT: The invention is an aircraft navigational computer having a transparent rotating disc for plotting wind vector solutions. Surrounding the periphery of the disc is a compass rose superimposed by a support frame having windows which indicate the compass headings of the various legs in the landing pattern for any specific runway.

PATENTED OCT 19 1971
3,614,393
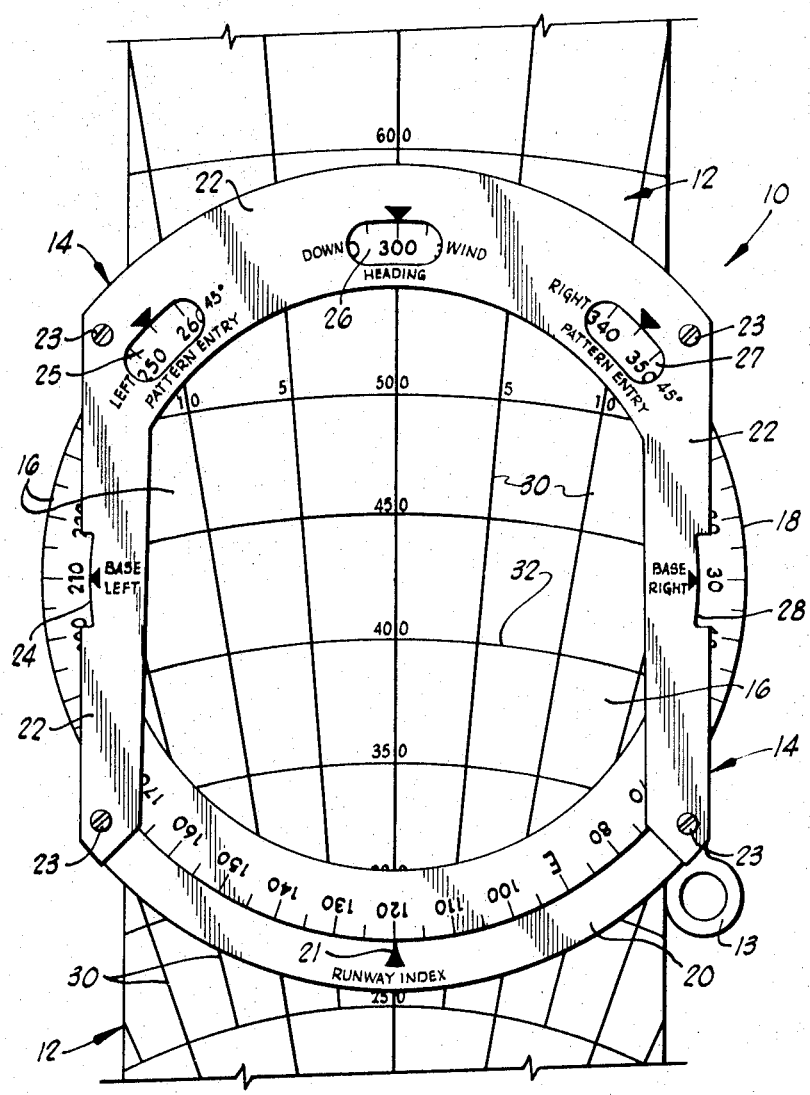
Fig.1
Fig.2
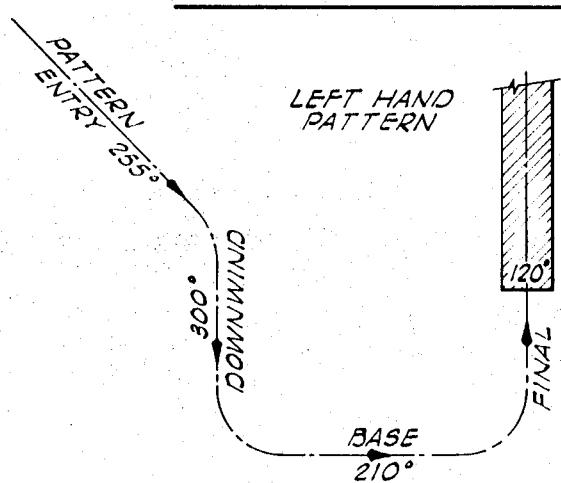
Fig.3
INVENTOR
PAUL E. SANDERSON
By Miller & Brown
ATTORNEY

NAVIGATIONAL COMPUTER

The present invention relates to a computing device and more particularly to a private aircraft computer for dead reckoning navigation which also provides the pilot with the proper compass headings for the various legs in a landing pattern.

BACKGROUND OF THE INVENTION

As an aircraft approaches an airport the pilot contacts the tower control by radio, and asks for landing instructions. The tower responds by giving him the bearing or direction of the landing runway. The flight regulations require that the pilot enter the traffic landing pattern at a 45° angle to the downwind leg which is called the "pattern entry leg." As the pilot enters the pattern he will turn right on to the downwind leg, if he is entering the left-hand pattern. At the end of the downwind leg he will turn 90° to the left to the base leg and another 90° turn to the left, placing him on the final approach leg in line with the runway. To properly guide his aircraft the pilot must compute in advance the various compass headings for each leg of the landing pattern. While this computation can be done mentally, it takes time and more importantly it distracts the pilot's attention from his principal task of controlling the aircraft in an area of high-density flying.

A computer which provides traffic pattern bearings for different runways has a definite need in the field of private aircraft as evidenced by U.S. Pat. No. 3,100,601. This patent provides a complex structure including two separate computers, with four individual discs and 10 separate compass rose scales.

The present invention provides these same functions along with a conventional navigation computer used for wind vector solutions, of the type illustrated in U.S. Pat. No. 3,231,188. This conventional computer utilizes a compass rose surrounding a transparent plotting disc which rotates in the body of the computer. The same compass rose used to plot wind vectors is used in the present invention to give the various landing pattern bearings with a single setting of the rose. Rather than two separate computers for right- and left-hand patterns, both patterns are provided for on the same ring. The single compass scale graduated from 0° to 360° performs the same function as the 10 separate scales in the computer mentioned above in U.S. Pat. No. 3,100,601.

It is therefore the principal object of the present invention to provide a simplified and improved computer for establishing the bearings of the various legs in landing patterns for any particular landing runway.

Another object of the present invention is to provide a single computer for both right- and left-hand landing patterns.

Another object of the present invention is to provide a simplified computer utilized for both dead-reckoning navigation as well as determining landing pattern bearings.

A further objective of the present invention is to provide a single device which performs a plurality of the necessary navigation calculations with a minimum amount of effort and with reasonable simplicity.

The invention together with other objects will be more clearly understood when the following description is read in connection with the accompanying drawings in which:

FIG. 1 is a plan view of the computer with portions of the sliding grid broken away to conserve space;

FIG. 2 is a side view of the computer; and

FIG. 3 is a diagram of a left-hand traffic landing pattern for runway 120.

Referring to the drawings for a detailed description of the invention and more specifically to FIG. 1, a composite computer is generally identified by reference numeral 10. The computer is made up of a rectangular grid member 12 slidably held in a body member 14. Superimposed over the sliding grid 12 is a transparent plotting disc 16 with a compass rose 18 calibrated in 10° increments, surrounding its periphery. The disc 16 is rotatably mounted in the body member 14 and is positioned by manually gripping the exposed sides of the ring 18. Located adjacent the rose 18 is a stationary true index scale 20 with a center index mark 21. Positioned over the disc 16 is a U-shaped support frame 22, anchored to the body member 14 by fastening screws 23. Also attached to the body 14 is a grommet 13 which receives some type of lanyard for carrying the computer while not in use.

The sliding grid member 12 has on its surface a series of radial and arcuate lines 30 and 32 respectively, which represent degrees of drift and increments of velocity or speed. These lines are utilized in conjunction with the rotating plotting disc 16 to solve wind and speed vector problems by graphic solution as described in detail in U.S. Pat. No. 3,231,188 mentioned above. The dead reckoning portion of the present invention is of the same type as that disclosed in the aforesaid patent.

The computer of the present invention utilizes the conventional compass rose 18 of the dead reckoning portion of the computer to provide the landing pattern bearing function. Located in the support frame 22 are a series of windows 24, 25, 26, 27 and 28 which indicate the respective landing pattern headings, namely; pattern entry, downwind, base and final legs in right- and left-hand traffic patterns as described in detail hereafter.

FIG. 3 is a diagram of the left-hand traffic pattern for runway 120.

OPERATION

Upon approaching an airport, the pilot will contact the tower control requesting landing instructions. The tower will respond by giving the landing runway in use along with wind and other data. The pilot will then take his computer and rotate the compass rose 18 until the bearing of the landing runway is aligned with center index mark 21. If for example, the landing runway is 120 (called runway 12 in aviation language), the ring will be positioned as seen in FIG. 1.

With the ring 18 so positioned, the bearings of the various legs in right- and left-hand landing patterns appear in windows 24, 25, 26, 27 and 28. Taking the left-hand pattern for example; the pattern entry leg would be 255, as seen in window 25, the downwind leg 300 in window 26, and the base leg 210 in window 24. The right-hand pattern, which is very seldom used, would be a mirror image of the left-hand pattern, as seen in FIG. 3, approaching the runway from the right rather than the left. The bearings for the right-hand pattern are read on the same compass scale without repositioning the ring 18, through windows 27, 26 and 28 respectively.

Flight regulations require that entry into the flight pattern be made on the downwind leg at an angle of 45° thereto. Taking the pattern entry bearing from window 25, the pilot will maneuver the aircraft so as to approach on that heading. When he enters the pattern he will turn to the right to the heading shown in window 26, placing him on the downwind leg. At the appropriate position, the pilot will turn to the base and final approach legs with the assistance of the bearing shown in window 24 of the computer. Without this type of computer, the pilot is required to make a mental calculation to figure the various headings, right at a crucial time when his undivided attention should be given to his manual control of the aircraft. With a copilot or navigator to assist, a proper traverse of the flight pattern is not so difficult but a majority of light moderate speed aircraft today are flown by one person without any assistance from the passengers or an automatic pilot.

Therefore, with only one qualified pilot-navigator, in most instances, it becomes rather important that the pilot be able to make all computations as fast as possible and with one hand if possible, leaving the other hand free to control and guide the aircraft.

Having described the invention with sufficient clarity to enable those familiar with the art to construct and use it, I claim:

1. An aircraft navigational computing device for determining the various landing pattern bearings for any specific runway, comprising:
    a base member;
    a circular plotting disc rotatably mounted in the base member having a calibrated compass rose surrounding its periphery;
    indexing means attached to the base member positioned adjacent the compass rose;
    a support frame overlying the compass rose of the plotting disc attached to the base member, and
    window means in the support frame positioned in such a manner over the compass rose to directly read the bearings of the various legs in a landing pattern when the bearing of the landing runway is aligned with the indexing means.

2. A navigational computing device as set forth in claim 1 wherein, the window means includes headings for right- and left-hand patterns.

3. A navigational computing device as set forth in claim 1 wherein, the window means includes headings for the pattern entry leg, downwind leg and base leg for both right- and left-hand patterns.

4. A navigational computing device as set forth in claim 1 wherein, the window means includes headings for both right- and left-hand patterns; the support frame is U-shaped with both legs substantially surrounding the plotting disc.

5. A navigational computing device as set forth in claim 1 wherein, the window means includes headings for both right- and left-hand patterns; the support frame being U-shaped substantially surrounding the plotting disc with portions of the compass rose extending outwardly from the two legs of the U-shaped support frame whereby the operator of the computer can manually grip said outwardly extending portions to position the disc.

6. An aircraft navigational computing device comprising:
    a base member;
    a grid member slidably received in the base member having a plurality of radial and arcuate lines thereon;
    a circular transparent plotting disc transposed over the grid member, mounted in the base member for rotation;
    a compass rose attached to and surrounding the periphery of the disc;
    indexing means attached to the base member positioned adjacent the compass rose;
    a U-shaped support frame overlying the plotting disc and attached to the base member; and
    window means in the support frame positioned in such a manner over the compass rose to directly read the bearings of the pattern entry, downwind and base legs of the landing pattern when the bearing of the landing runway is aligned with the indexing means.

7. A navigational computing device as set forth in claim 6 wherein, the window means includes headings for both right- and left-hand patterns.

8. A navigational computing device as set forth in claim 6 wherein, the window means includes headings for both right- and left-hand patterns; the U-shaped support frame having two legs each traversing the compass rose in such a manner that portions of the compass rose extend outwardly therefrom for manual rotative positioning of the plotting disc.